United States Patent
Okamoto

(10) Patent No.: US 11,795,188 B2
(45) Date of Patent: Oct. 24, 2023

(54) TRANSITION METAL COMPOUND AND METHOD FOR PRODUCING OLEFIN POLYMER

(71) Applicant: IDEMITSU KOSAN CO., LTD., Chiyoda-ku (JP)

(72) Inventor: Takuji Okamoto, Ichihara (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 316 days.

(21) Appl. No.: 17/269,865

(22) PCT Filed: Sep. 2, 2019

(86) PCT No.: PCT/JP2019/034464
§ 371 (c)(1),
(2) Date: Feb. 19, 2021

(87) PCT Pub. No.: WO2020/050226
PCT Pub. Date: Mar. 12, 2020

(65) Prior Publication Data
US 2021/0198300 A1  Jul. 1, 2021

(30) Foreign Application Priority Data
Sep. 5, 2018  (JP) ................. 2018-165958

(51) Int. Cl.
*C07F 17/00* (2006.01)
*C08F 4/6592* (2006.01)
*C08F 4/52* (2006.01)

(52) U.S. Cl.
CPC ............... *C07F 17/00* (2013.01); *C08F 4/52* (2013.01); *C08F 4/65927* (2013.01)

(58) Field of Classification Search
CPC ..... C07F 17/00; C08F 4/65027; C08F 110/06
See application file for complete search history.

(56) References Cited

U.S. PATENT DOCUMENTS

| | | | |
|---|---|---|---|
| 6,906,155 | B1 | 6/2005 | Minami et al. |
| 7,173,099 | B1 | 2/2007 | Minami |
| 2005/0043495 | A1 | 2/2005 | Minami et al. |
| 2006/0293471 | A1 | 12/2006 | Minami et al. |
| 2007/0043192 | A1 | 2/2007 | Okamoto et al. |
| 2009/0215973 | A1 | 8/2009 | Minami et al. |
| 2015/0252226 | A1 | 9/2015 | Yabukami et al. |
| 2020/0123360 | A1 | 4/2020 | Kanamaru et al. |

FOREIGN PATENT DOCUMENTS

| | | |
|---|---|---|
| DE | 11 2018 002 107 T5 | 1/2020 |
| JP | 2000-256411 A | 9/2000 |
| JP | 2001-139620 A | 5/2001 |
| JP | 2010-265473 A | 11/2010 |
| WO | WO 2018/193894 A1 | 10/2018 |

OTHER PUBLICATIONS

Japanese Office Action dated Sep. 27, 2022 in Japanese Patent Application No. 2018-165958 (with unedited computer generated English translation), 3 pages.
International Search Report dated Nov. 5, 2019 in PCT/JP2019/034464 filed on Sep. 2, 2019, 2 pages.
Extended European Search Report dated May 20, 2022, in corresponding European Patent Application No. 19856816.4, 8 pages.
Notice of Reasons for Refusal dated Feb. 21, 2023 in Japanese Patent Application No. 2018-165958 (with English machine translation), 3 pages.

*Primary Examiner* — Caixia Lu
(74) *Attorney, Agent, or Firm* — Oblon, McClelland, Maier & Neustadt, L.L.P.

(57) ABSTRACT

A transition metal compound from Periodic Table Group 3 to 10 or lanthanide, of formula (I):

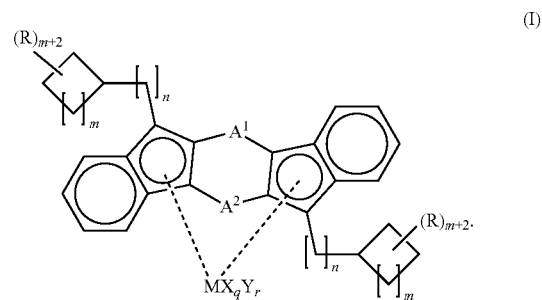

In formula (I), $A^1$ and $A^2$ are independently a crosslinker of formula (II)

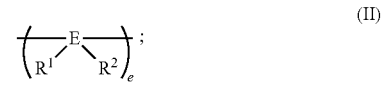

X is a σ or π-bonding ligand, and plural Xs may differ; Y is a Lewis base, and plural Ys may differ and/or crosslink with Y or X; q is an integer from 1 to 5, representing [(valence of M)−2]; r is an integer from 0 to 3; M is a metal from Group 3 to 10 or a lanthanide; n and m are independently an integer from 0 to 4; and plural Rs may differ. In formula (II), E is C, Si, Ge, or Sn; $R^1$ and $R^2$ are independently a H, a halogen, or a C1 to C20 hydrocarbon, optionally halogenated, and may bond together to form a ring, and e is an integer from 1 to 4.

9 Claims, No Drawings

TRANSITION METAL COMPOUND AND METHOD FOR PRODUCING OLEFIN POLYMER

TECHNICAL FIELD

The present invention relates to a transition metal compound and a production method for an olefin-based polymer including using the transition metal compound as a catalyst.

BACKGROUND ART

Hitherto, in a polymerization reaction of an olefin-based polymer, a polymerization catalyst containing, for example, a transition metal compound and a promoter component (e.g., a metallocene catalyst or a Ziegler catalyst) has been generally used.

In, for example, Patent Literature 1, there is a disclosure of a catalyst for polymerizing olefins, which is obtained by bringing a transition metal compound having a specific structure, a compound that can react with the transition metal compound to form an ionic complex, and an organoaluminum compound into contact with each other.

CITATION LIST

Patent Literature

PTL 1: JP 2010-265473 A

SUMMARY OF INVENTION

Technical Problem

In recent years, in, for example, a hot-melt adhesive, from the viewpoints of improving its productivity and preventing its exudation, an olefin-based polymer having high stereoregularity has tended to be required for increasing the solidification rate of the adhesive. Accordingly, a polymerization catalyst for obtaining an olefin-based polymer having high stereoregularity while maintaining physical properties intrinsic to the olefin-based polymer, such as softness, has been required. However, it has been difficult for the polymerization catalyst described in Patent Literature 1 to provide an olefin-based polymer having sufficiently high stereoregularity.

The present invention has been made in view of such circumstances, and an object of the present invention is to provide a transition metal compound that can synthesize an olefin-based polymer having high stereoregularity, and a production method for an olefin-based polymer including using the transition metal compound as a catalyst.

Solution to Problem

The inventors of the present invention have made extensive investigations with a view to solving the problem, and as a result, have found that the problem is solved by using a transition metal compound having a specific structure. The present invention has been completed on the basis of such finding.

That is, the disclosure of the present application relates to the following.

[1] A transition metal compound belonging to any one of Groups 3 to 10 of the periodic table, or a lanthanoid series thereof, which is represented by the following general formula (I):

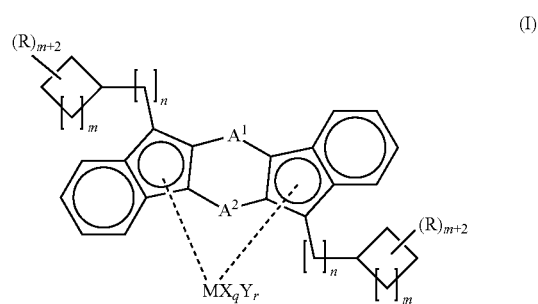

wherein $A^1$ and $A^2$ each independently represent a cross-linking group represented by the following general formula (II), and may be identical to or different from each other, X represents a σ-bonding or π-bonding ligand, and when a plurality of X's are present, the plurality of X's may be identical to or different from each other, Y represents a Lewis base, and when a plurality of Y's are present, the plurality of Y's may be identical to or different from each other, and the Y may be crosslinked with another Y or the X, "q" represents an integer of from 1 to 5, and represents [(valence of M)−2], "r" represents an integer of from 0 to 3, M represents a metal element belonging to any one of Groups 3 to 10 of the periodic table, or the lanthanoid series thereof, "n" represents an integer of from 0 to 4, "m" represents an integer of from 0 to 4, and R represents a substituent of a cycloalkyl group, and a plurality of R's may be identical to or different from each other;

wherein E represents C, Si, Ge, or Sn, $R^1$ and $R^2$ each independently represent a hydrogen atom, a halogen atom, a hydrocarbon group having 1 to 20 carbon atoms, or a halogenated hydrocarbon group having 1 to 20 carbon atoms, and may be identical to or different from each other, or may be bonded to each other to form a ring, and "e" represents an integer of from 1 to 4.

[2] The transition metal compound according to the above-mentioned item [1], wherein the "n" represents 0 or 1.

[3] The transition metal compound according to the above-mentioned item [1] or [2], wherein when the "n" represents 2, the transition metal compound represented by the general formula (I) is a transition metal compound represented by the following general formula (III), and when the "n" represents 3, the transition metal compound represented by the general formula (I) is a transition metal compound represented by the following general formula (IV):

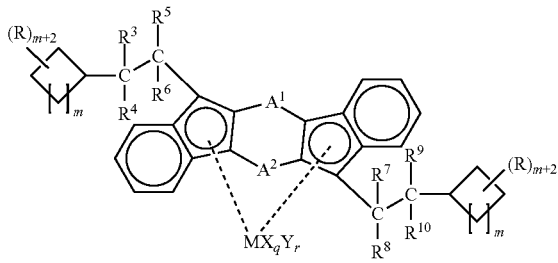

(III)

wherein $A^1$, $A^2$, X, Y, M, R, "q", "r", and "m" are as described above, and $R^3$ to $R^{10}$ each independently represent a hydrogen atom or an alkyl group;

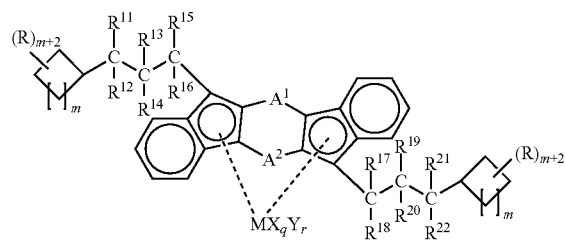

(IV)

wherein $A^1$, $A^2$, X, Y, M, R, "q", "r", and "m" are as described above, and $R^{11}$ to $R^{22}$ each independently represent a hydrogen atom or an alkyl group.

[4] The transition metal compound according to any one of the above-mentioned items [1] to [3], wherein the "m" represents 0 or 1.

[5] The transition metal compound according to any one of the above-mentioned items [1] to [4], wherein the E represents Si or Ge.

[6] The transition metal compound according to any one of the above-mentioned items [1] to [5], wherein the M represents a metal element belonging to Group 4 of the periodic table.

[7] The transition metal compound according to any one of the above-mentioned items [1] to [6], wherein the R's each independently represent a hydrogen atom, an alkyl group, an aryl group, a halogen atom, an amino group, or a sulfur-containing group, and when the R's each represent an alkyl group, two adjacent alkyl groups may form a ring.

[8] A production method for an olefin-based polymer, including the step of polymerizing an olefin in the presence of a polymerization catalyst containing the transition metal compound of any one of the above-mentioned items [1] to [7].

[9] The production method for an olefin-based polymer according to the above-mentioned item [8], wherein the polymerization catalyst further contains a boron compound capable of reacting with the transition metal compound to form an ionic complex.

Advantageous Effect of Invention

According to the present invention, the transition metal compound that can synthesize an olefin-based polymer having high stereoregularity, and the production method for an olefin-based polymer including using the transition metal compound as a catalyst can be provided.

DESCRIPTION OF EMBODIMENTS

The present invention is described in detail below. The term "A to B" as used herein concerning the description of a numerical value means "A or more and B or less" (when A<B) or "A or less and B or more" (when A>B). In addition, in the present invention, a combination of preferred aspects is a more preferred aspect.

[Transition Metal Compound]

A transition metal compound of this embodiment is a transition metal compound belonging to any one of Groups 3 to 10 of the periodic table, or the lanthanoid series thereof, which is represented by the following general formula (I). When the transition metal compound is used in combination with a specific promoter in a production method for an olefin-based polymer to be described later, an olefin-based polymer having high stereoregularity can be synthesized.

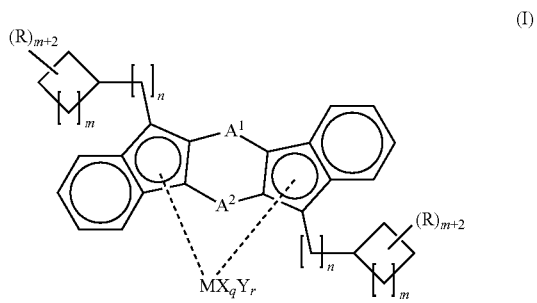

(I)

In the formula, $A^1$ and $A^2$ each independently represent a crosslinking group represented by the following general formula (II), and may be identical to or different from each other, X represents a σ-bonding or π-bonding ligand, and when a plurality of X's are present, the plurality of X's may be identical to or different from each other, Y represents a Lewis base, and when a plurality of Y's are present, the plurality of Y's may be identical to or different from each other, and the Y may be crosslinked with another Y or the X, "q" represents an integer of from 1 to 5, and represents [(valence of M)–2], "r" represents an integer of from 0 to 3, M represents a metal element belonging to any one of Groups 3 to 10 of the periodic table, or the lanthanoid series thereof, "n" represents an integer of from 0 to 4, "m" represents an integer of from 0 to 4, and R represents a substituent of a cycloalkyl group, and a plurality of R's may be identical to or different from each other.

(II)

In the formula, E represents C, Si, Ge, or Sn, $R^1$ and $R^2$ each independently represent a hydrogen atom, a halogen atom, a hydrocarbon group having 1 to 20 carbon atoms, or a halogenated hydrocarbon group having 1 to 20 carbon atoms, and may be identical to or different from each other, or may be bonded to each other to form a ring, and "e" represents an integer of from 1 to 4.

Examples of the halogen atom in the general formula (II) include a chlorine atom, a fluorine atom, a bromine atom, and an iodine atom. Specific examples of the hydrocarbon group having 1 to 20 carbon atoms include an alkyl group, such as a methyl group, an ethyl group, a propyl group, a butyl group, a hexyl group, a cyclohexyl group, and an octyl group; an alkenyl group, such as a vinyl group, a propenyl group, and a cyclohexenyl group; an arylalkyl group, such as a benzyl group, a phenylethyl group, and a phenylpropyl group; and an aryl group, such as a phenyl group, a tolyl group, a dimethylphenyl group, a trimethylphenyl group, an ethylphenyl group, a propylphenyl group, a biphenyl group, a naphthyl group, a methylnaphthyl group, an anthracenyl group, and a phenanthryl group. Among them, an alkyl group, such as a methyl group, an ethyl group, and a propyl group, and an aryl group, such as a phenyl group, are preferred. The halogenated hydrocarbon group having 1 to 20 carbon atoms is, for example, a halogenated hydrocarbon group obtained by substituting the hydrocarbon group with a halogen atom. Among such groups, a halogenated alkyl group, such as a trifluoromethyl group or a trichloromethyl group, is preferred.

Specific examples of the crosslinking group in which the E represents a carbon atom (C) include: alkylidene groups, such as a methylene group, an ethylidene group, a propylidene group, an isopropylidene group, and a cyclohexylidene group; a 1,1-cyclohexylene group, and a vinylidene group. Specific examples of the crosslinking group in which the E represents a silicon atom (Si) include: alkylsilylene groups, such as a methylsilylene group, a dimethylsilylene group, a diethylsilylene group, a di(n-propyl)silylene group, a di(i-propyl)silylene group, and a di(cyclohexyl)silylene group; alkylarylsilylene groups, such as a methylphenylsilylene group and an ethylphenylsilylene group; and arylsilylene groups, such as a diphenylsilylene group, a di(p-tolyl)silylene group, and a di(p-chlorophenyl)silylene group. The crosslinking group in which the E represents a germanium atom (Ge) is specifically, for example, a germylene group obtained by substituting the silicon atom of the crosslinking group in which the E represents the silicon atom with the germanium atom. The crosslinking group in which the E represents a tin atom (Sn) is specifically, for example, a stannylene group obtained by substituting the silicon atom of the crosslinking group in which the E represents the silicon atom with the tin atom.

The E preferably represents Si or Ge.

The X represents a σ-bonding or π-bonding ligand, and when the plurality of X's are present, the plurality of X's may be identical to or different from each other.

Examples of the σ-bonding ligand include a halogen atom, a hydrocarbon group having 1 to 20 carbon atoms, an alkoxy group having 1 to 20 carbon atoms, an aryloxy group having 6 to 20 carbon atoms, an amide group having 1 to 20 carbon atoms, a silicon-containing group having 1 to 20 carbon atoms, a phosphide group having 1 to 20 carbon atoms, a sulfide group having 1 to 20 carbon atoms, a sulfoxide group having 1 to 20 carbon atoms, and an acyl group having 1 to 20 carbon atoms. Among them, a halogen atom or a hydrocarbon group having 1 to 20 carbon atoms is preferred. Specific examples of the halogen atom and the hydrocarbon group having 1 to 20 carbon atoms are the same as those described above.

Examples of the alkoxy group having 1 to 20 carbon atoms include: an alkoxy group, such as a methoxy group, an ethoxy group, a propoxy group, and a butoxy group; a phenylmethoxy group; and a phenylethoxy group. Examples of the aryloxy group having 6 to 20 carbon atoms include a phenoxy group, a methylphenoxy group, and a dimethylphenoxy group. Examples of the amide group having 1 to 20 carbon atoms include: an alkylamide group, such as a dimethylamide group, a diethylamide group, a dipropylamide group, a dibutylamide group, a dicyclohexylamide group, and a methylethylamide group; an alkenylamide group, such as a divinylamide group, a dipropenylamide group, and a dicyclohexenylamide group; an arylalkylamide group, such as a dibenzylamide group, a phenylethylamide group, and a phenylpropylamide group; and an arylamide group, such as a diphenylamide group and a dinaphthylamide group.

Examples of the silicon-containing group having 1 to 20 carbon atoms include: a mono-hydrocarbon-substituted silyl group, such as a methylsilyl group and a phenylsilyl group; a dihydrocarbon-substituted silyl group, such as a dimethylsilyl group and a diphenylsilyl group; a trihydrocarbon-substituted silyl group, such as a trimethylsilyl group, a triethylsilyl group, a tripropylsilyl group, a tricyclohexylsilyl group, a triphenylsilyl group, a dimethylphenylsilyl group, a methyldiphenylsilyl group, a tritolylsilyl group, and a trinaphthylsilyl group; a hydrocarbon-substituted silyl ether group, such as a trimethylsilyl ether group; a silicon-substituted alkyl group, such as a trimethylsilylmethyl group and a phenyldimethylsilylethyl group; and a silicon-substituted aryl group, such as a trimethylsilylphenyl group. Among them, a trimethylsilylmethyl group, a phenyldimethylsilylethyl group, and the like are preferred.

Examples of the phosphide group having 1 to 20 carbon atoms include: an alkyl phosphide group, such as a dimethyl phosphide group, a diethyl phosphide group, a dipropyl phosphide group, a dibutyl phosphide group, a dihexyl phosphide group, a dicyclohexyl phosphide group, and a dioctyl phosphide group; an alkenyl phosphide group, such as a divinyl phosphide group, a dipropenyl phosphide group, and a dicyclohexenyl phosphide group; an arylalkyl phosphide group, such as a dibenzyl phosphide group, a phenylethyl phosphide group, and a phenylpropyl phosphide group; and an aryl phosphide group, such as a diphenyl phosphide group, a ditolyl phosphide group, a bis(dimethylphenyl) phosphide group, a bis(trimethylphenyl) phosphide group, a bis(ethylphenyl) phosphide group, a bis(propylphenyl) phosphide group, a bis(biphenyl) phosphide group, a dinaphthyl phosphide group, a bis(methylnaphthyl) phosphide group, a dianthracenyl phosphide group, and a diphenanthryl phosphide group.

Examples of the sulfide group having 1 to 20 carbon atoms include: an alkyl sulfide group, such as a methyl sulfide group, an ethyl sulfide group, a propyl sulfide group, a butyl sulfide group, a hexyl sulfide group, a cyclohexyl sulfide group, and an octyl sulfide group; an alkenyl sulfide group, such as a vinyl sulfide group, a propenyl sulfide group, and a cyclohexenyl sulfide group; an arylalkyl sulfide group, such as a benzyl sulfide group, a phenylethyl sulfide group, and a phenylpropyl sulfide group; and an aryl sulfide group, such as a phenyl sulfide group, a tolyl sulfide group, a dimethylphenyl sulfide group, a trimethylphenyl sulfide group, an ethylphenyl sulfide group, a propylphenyl sulfide group, a biphenyl sulfide group, a naphthyl sulfide group, a methylnaphthyl sulfide group, an anthracenyl sulfide group, and a phenanthryl sulfide group.

Examples of the sulfoxide group having 1 to 20 carbon atoms include: alkyl sulfoxide groups, such as a methyl sulfoxide group, an ethyl sulfoxide group, a propyl sulfoxide group, a butyl sulfoxide group, a hexyl sulfoxide group, a cyclohexyl sulfoxide group, and an octyl sulfoxide group; alkenyl sulfoxide groups, such as a vinyl sulfoxide group, a propenyl sulfoxide group, and a cyclohexenyl sulfoxide group; arylalkyl sulfoxide groups, such as a benzyl sulfoxide group, a phenylethyl sulfoxide group, and a phenylpropyl sulfoxide group; and aryl sulfoxide groups, such as a phenyl sulfoxide group, a tolyl sulfoxide group, a dimethylphenyl sulfoxide group, a trimethylphenyl sulfoxide group, an ethylphenyl sulfoxide group, a propylphenyl sulfoxide group, a biphenyl sulfoxide group, a naphthyl sulfoxide group, a methylnaphthyl sulfoxide group, an anthracenyl sulfoxide group, and a phenanthryl sulfoxide group.

Examples of the acyl group having 1 to 20 carbon atoms include: a formyl group; an alkylacyl group, such as an acetyl group, a propionyl group, a butyryl group, a valeryl group, a palmitoyl group, a stearoyl group, and an oleoyl group; an arylacyl group, such as a benzoyl group, a toluoyl group, a salicyloyl group, a cinnamoyl group, a naphthoyl group, and a phthaloyl group; and an oxalyl group, a malonyl group, and a succinyl group, which are derived from oxalic acid, malonic acid, and succinic acid, each being a dicarboxylic acid, respectively.

Specific examples of the π-bonding ligand include: a compound having 4 to 20 carbon atoms and having a conjugated diene bond; and a compound having 5 to 20 carbon atoms and having a nonconjugated diene bond. Examples of the compound having 4 to 20 carbon atoms and having a conjugated diene bond include 1,3-butadiene, isoprene, chloroprene, 1,3-heptadiene, 1,3-hexadiene, 1,3,5-hexatriene, 1,3,6-heptatriene, and diphenylbutadiene. Examples of the compound having 5 to 20 carbon atoms and having a nonconjugated diene bond include 1,4-pentadiene and 1,5-hexadiene.

The Y represents a Lewis base, and when the plurality of Y's are present, the plurality of Y's may be identical to or different from each other. In addition, the Y may be cross-linked with any other Y or the X. In addition, in some cases, the Y may be crosslinked with a cyclopentadienyl ring of the general formula (I). Examples of the Lewis base represented by the Y include an amine, an ether, a phosphine, and a thioether.

Examples of the amine include amines having 1 to 20 carbon atoms, and specific examples thereof include: alkylamines, such as methylamine, ethylamine, propylamine, butylamine, cyclohexylamine, methylethylamine, dimethylamine, diethylamine, dipropylamine, dibutylamine, and dicyclohexylamine; alkenylamines, such as vinylamine, propenylamine, cyclohexenylamine, divinylamine, dipropenylamine, and dicyclohexenylamine; arylalkylamines, such as phenylethylamine and phenylpropylamine; and arylamines, such as phenylamine, diphenylamine, and dinaphthylamine.

Examples of the ether include: aliphatic monoether compounds, such as methyl ether, ethyl ether, propyl ether, isopropyl ether, butyl ether, isobutyl ether, n-amyl ether, and isoamyl ether; aliphatic mixed ether compounds, such as methylethyl ether, methylpropyl ether, methylisopropyl ether, methyl-n-amyl ether, methylisoamyl ether, ethylpropyl ether, ethylisopropyl ether, ethylbutyl ether, ethylisobutyl ether, ethyl-n-amyl ether, and ethylisoamyl ether; aliphatic unsaturated ether compounds, such as vinyl ether, allyl ether, methylvinyl ether, methylallyl ether, ethylvinyl ether, and ethylallyl ether; aromatic ether compounds, such as anisole, phenetole, phenyl ether, benzyl ether, phenylbenzyl ether, α-naphthyl ether, and β-naphthyl ether; and cyclic ether compounds, such as ethylene oxide, propylene oxide, trimethylene oxide, tetrahydrofuran, tetrahydropyran, and dioxane.

Examples of the phosphine include: phosphines having 1 to 20 carbon atoms. Specific examples thereof include: alkyl phosphines, such as monohydrocarbon-substituted phosphines, such as methyl phosphine, ethyl phosphine, propyl phosphine, butyl phosphine, hexyl phosphine, cyclohexyl phosphine, and octyl phosphine; dihydrocarbon-substituted phosphines, such as dimethyl phosphine, diethyl phosphine, dipropyl phosphine, dibutyl phosphine, dihexyl phosphine, dicyclohexyl phosphine, and dioctyl phosphine; and trihydrocarbon-substituted phosphines, such as trimethyl phosphine, triethyl phosphine, tripropyl phosphine, tributyl phosphine, trihexyl phosphine, tricyclohexyl phosphine, and trioctyl phosphine; monoalkenyl phosphines, such as vinyl phosphine, propenyl phosphine, and cyclohexenyl phosphine; dialkenyl phosphines in which two hydrogen atoms of phosphine are each substituted with alkenyl; trialkenyl phosphines in which three hydrogen atoms of phosphine are each substituted with alkenyl; and arylphosphines, such as arylalkyl phosphines, such as benzyl phosphine, phenylethyl phosphine, and phenylpropyl phosphine; diarylalkyl phosphines or aryldialkyl phosphines in which three hydrogen atoms of phosphine are each substituted with aryl or alkenyl; phenyl phosphine, tolyl phosphine, dimethylphenyl phosphine, trimethylphenyl phosphine, ethylphenyl phosphine, propylphenyl phosphine, biphenyl phosphine, naphthyl phosphine, methylnaphthyl phosphine, anthracenyl phosphine, and phenanthryl phosphine; di(alkylaryl) phosphines in which two hydrogen atoms of phosphine are each substituted with alkylaryl; and tri(alkylaryl)phosphines in which three hydrogen atoms of phosphine are each substituted with alkylaryl. Examples of the thioether include the above-mentioned sulfides.

The "q" represents an integer of from 1 to 5, and represents [(valence of M)−2], and the "r" represents an integer of from 0 to 3.

The M represents a metal element belonging to Groups 3 to 10 of the periodic table, or the lanthanoid series thereof, and specific examples thereof include titanium, zirconium, hafnium, vanadium, chromium, manganese, nickel, cobalt, palladium, and lanthanoid metals. The M preferably represents a metal element belonging to Group 4 of the periodic table because the activity of the transition metal compound is improved.

The "n" represents an integer of from 0 to 4, preferably 0 or 1. In addition, the "m" represents an integer of from 0 to 4, preferably 0 or 1.

The R represents a substituent of a cycloalkyl group, and the plurality of R's may be identical to or different from each other. However, the tertiary carbon atom of the cycloalkyl group is free of the substituent R. It is preferred that the R's each independently represent a hydrogen atom, an alkyl group, an aryl group, a halogen atom, an amino group, or a sulfur-containing group. In addition, when the R's each represent an alkyl group, two adjacent alkyl groups may form a ring.

The alkyl group is preferably an alkyl group having 1 to 6 carbon atoms, and specific examples thereof include a methyl group, an ethyl group, and a n-propyl group.

The aryl group is preferably an aryl group having 6 to 12 ring-forming atoms, and specific examples thereof include a phenyl group, a 3,5-dimethylphenyl group, and a p-tolyl group.

Examples of the halogen atom include a chlorine atom, a fluorine atom, a bromine atom, and an iodine atom.

Examples of the amino group include a dimethylamino group and a diethylamino group.

Examples of the sulfur-containing group include a methylthio group and a phenylthio group.

In addition, it is preferred that, when the "n" represents 2, the transition metal compound represented by the general formula (I) be a transition metal compound represented by the following general formula (III), and it is preferred that, when the "n" represents 3, the transition metal compound represented by the general formula (I) be a transition metal compound represented by the following general formula (IV):

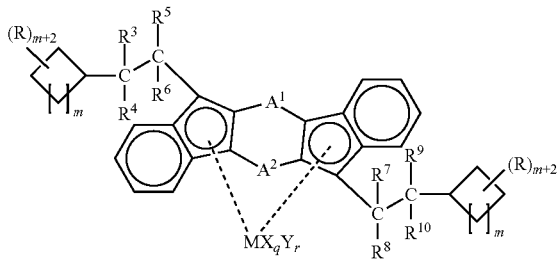

(III)

wherein $A^1$, $A^2$, X, Y, M, R, "q", "r", and "m" are as described above, and $R^3$ to $R^{10}$ each independently represent a hydrogen atom or an alkyl group;

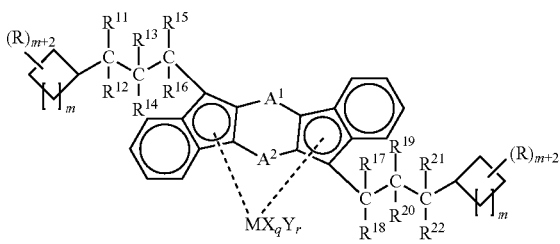

(IV)

wherein $A^1$, $A^2$, X, Y, M, R, "q", "r", and "m" are as described above, and $R^{11}$ to $R^{22}$ each independently represent a hydrogen atom or an alkyl group.

The alkyl groups represented by $R^3$ to $R^{22}$ are each preferably an alkyl group having 1 to 6 carbon atoms, and specific examples thereof include a methyl group, an ethyl group, and a n-propyl group.

Specific examples of the transition metal compound represented by the general formula (I) include, as examples of Group 4 of the periodic table, (1,2'-dimethylsilylene)(2,1'-dimethylsilylene)bis(3-cycloheptylindenyl)zirconium dichloride,
(1,2'-dimethylsilylene)(2,1'-dimethylsilylene)bis(3-cycloheptylmethylindenyl)zirconium dichloride,
(1,2'-dimethylsilylene)(2,1'-dimethylsilylene)bis(3-cycloheptylethylindenyl)zirconium dichloride,
(1,2'-dimethylsilylene)(2,1'-dimethylsilylene)bis(3-cyclohexylindenyl)zirconium dichloride,
(1,2'-dimethylsilylene)(2,1'-dimethylsilylene)bis(3-cyclohexylmethylindenyl)zirconium dichloride,
(1,2'-dimethylsilylene)(2,1'-dimethylsilylene)bis(3-cyclohexylethylindenyl)zirconium dichloride,
(1,2'-dimethylsilylene)(2,1'-dimethylsilylene)bis(3-cyclopropylindenyl)zirconium dichloride,
(1,2'-dimethylsilylene)(2,1'-dimethylsilylene)bis(3-cyclopropylmethylindenyl)zirconium dichloride,
(1,2'-dimethylsilylene)(2,1'-dimethylsilylene)bis(3-cyclopropylethylindenyl)zirconium dichloride,
(1,2'-dimethylsilylene)(2,1'-dimethylsilylene)bis(3-(3-cyclopropylpropyl)indenyl)zirconium dichloride,
(1,2'-dimethylsilylene)(2,1'-dimethylsilylene)bis(3-cyclobutylindenyl)zirconium dichloride,
(1,2'-dimethylsilylene)(2,1'-dimethylsilylene)bis(3-cyclobutylmethylindenyl)zirconium dichloride, and
(1,2'-dimethylsilylene)(2,1'-dimethylsilylene)bis(3-cyclobutylethylindenyl)zirconium dichloride. Among them, from the viewpoints of high polymerization activity and regularity,
(1,2'-dimethylsilylene)(2,1'-dimethylsilylene)bis(3-cyclohexylmethylindenyl)zirconium dichloride,
(1,2'-dimethylsilylene)(2,1'-dimethylsilylene)bis(3-cyclopropylmethylindenyl)zirconium dichloride,
(1,2'-dimethylsilylene)(2,1'-dimethylsilylene)bis(3-cyclopropylindenyl)zirconium dichloride, and
(1,2'-dimethylsilylene)(2,1'-dimethylsilylene)bis(3-cyclobutylmethylindenyl)zirconium dichloride are preferred.

[Production Method for Olefin-Based Polymer]

A production method for an olefin-based polymer of this embodiment includes the step of polymerizing an olefin in the presence of a polymerization catalyst containing the transition metal compound (component (A)) described above. In particular, the polymerization catalyst preferably further contains a boron compound capable of reacting with the transition metal compound to form an ionic complex, and hence the method preferably includes the step of polymerizing the olefin in the presence of the polymerization catalyst containing the transition metal compound (component (A)) described above and the boron compound (component (B)) capable of reacting with the transition metal compound to form an ionic complex.

In this embodiment, an olefin-based polymer having sufficiently high stereoregularity can be produced by using the component (A) and the component (B) in combination as the polymerization catalyst.

The compounds described in the section [Transition Metal Compound] may each be used as the transition metal compound.

The boron compound capable of reacting with the transition metal compound to form an ionic complex described above may be, for example, a coordination complex compound formed of an anion with a plurality of groups bonded to boron and a cation.

There are various types of the coordination complex compound formed of an anion with a plurality of groups bonded to boron and a cation, and for example, a compound represented by the general formula (V) or (VI) may be preferably used:

$$([L^1\text{-}H]^{s+})_t([BZ^1Z^2Z^3Z^4]^-)_1 \qquad (V)$$

$$([L^2]^{s+})_t([BZ^1Z^2Z^3Z^4]^-)_1 \qquad (VI)$$

wherein in the general formula (V) or (VI): $L^2$ represents $M^1$, $R^{23}R^{24}M^2$, or $R^{25}{}_3C$ to be described later, $L^1$ represents a Lewis base, $M^1$ represents a metal selected from Group 1 and Group 8 to Group 12 of the periodic table, $M^2$ represents a metal selected from Group 8 to Group 10 of the periodic table, $Z^1$ to $Z^4$ each represent a hydrogen atom, a dialkylamino group, an alkoxy group, an aryloxy group, an alkyl group having 1 to 20 carbon atoms, an aryl group having 6 to 20 carbon atoms, an alkylaryl group, an arylalkyl group, a substituted alkyl group, an organometalloid group, or a halogen atom;

$R^{23}$ and $R^{24}$ each represent a cyclopentadienyl group, a substituted cyclopentadienyl group, an indenyl group, or a fluorenyl group, and $R^{25}$ represents an alkyl group; and "s" represents an integer of from 1 to 7 representing the ionic valence of $L^1$-H or $L^2$, "t" represents an integer of 1 or more, and 1=t×s.

$M^1$ represents a metal selected from Group 1 and Group 8 to Group 12 of the periodic table, and specific examples thereof include atoms of Ag, Cu, Na, and Li. $M^2$ represents a metal selected from Group 8 to Group 10 of the periodic table, and specific examples thereof include atoms of Fe, Co, and Ni.

Specific examples of $Z^1$ to $Z^4$ include: dialkylamino groups, such as a dimethylamino group and a diethylamino group; alkoxy groups, such as a methoxy group, an ethoxy group, and a n-butoxy group; aryloxy groups, such as a phenoxy group, a 2,6-dimethylphenoxy group, and a naphthyloxy group; alkyl groups each having 1 to 20 carbon atoms, such as a methyl group, an ethyl group, a n-propyl group, an isopropyl group, a n-butyl group, a n-octyl group, and a 2-ethylhexyl group; aryl groups, alkylaryl groups, or arylalkyl groups each having 6 to 20 carbon atoms, such as a phenyl group, a p-tolyl group, a benzyl group, a pentafluorophenyl group, a 3,5-di(trifluoromethyl)phenyl group, a 4-tert-butylphenyl group, a 2,6-dimethylphenyl group, a 3,5-dimethylphenyl group, a 2,4-dimethylphenyl group, and a 1,2-dimethylphenyl group; halogens, such as F, Cl, Br, and I; and organometalloid groups, such as a tetramethylantimony group, a trimethylsilyl group, a trimethylgermyl group, a diphenylarsine group, a dicyclohexylantimony group, and a diphenylboron group.

Specific examples of the substituted cyclopentadienyl group represented by each of $R^3$ and $R^4$ include a methylcyclopentadienyl group, a butylcyclopentadienyl group, and a pentamethylcyclopentadienyl group.

In this embodiment, specific examples of the anion with a plurality of groups bonded to boron include $B(C_6F_5)_4^-$, $B(C_6HF_4)_4^-$, $B(C_6H_2F_3)_4^-$, $B(C_6H_3F_2)_4^-$, $B(C_6H_4F)_4^-$, $B(C_6CF_3F_4)_4^-$, $B(C_6H_5)_4^-$, and $BF_4^-$.

In addition, examples of the metal cation include $Cp_2Fe^+$, $(MeCp)_2Fe^+$, $(tBuCp)_2Fe^+$, $(Me_2Cp)_2Fe^+$, $(Me_3Cp)_2Fe^+$, $(Me_4Cp)_2Fe^+$, $(Me_5Cp)_2Fe^+$, $Ag^+$, $Na^+$, and $Li^+$. In addition, examples of the other cation include: a nitrogen-containing compound, such as pyridinium, 2,4-dinitro-N,N-diethylanilinium, diphenylammonium, p-nitroanilinium, 2,5-dichloroanilium, p-nitro-N,N-dimethylanilinium, quinolinium, N,N-dimethylanilinium, or N,N-diethylanilinium; a carbenium compound, such as triphenylcarbenium, tri(4-methylphenyl)carbenium, or tri(4-methoxyphenyl)carbenium; an alkyl phosphonium ion, such as $CH_3PH_3^+$, $C_2H_5PH_3^+$, $C_3H_7PH_3^+$, $(CH_3)_2PH_2^+$, $(C_2H_5)_2PH_2^+$, $(C_3H_7)_2PH_2^+$, $(CH_3)_3PH^+$, $(C_2H_5)_3PH^+$, $(C_3H_7)_3PH^+$, $(CF_3)_3PH^+$, $(CH_3)_4P^+$, $(C_2H_5)_4P^+$, or $(C_3H_7)_4P^+$; and an aryl phosphonium ion, such as $C_6H_5PH_3^+$, $(C_6H_5)_2PH_2^+$, $(C_6H_5)_3PH^+$, $(C_6H_5)_4P^+$, $(C_2H_5)_2(C_6H_5)PH^+$, $(CH_3)(C_6H_5)PH_2^+$, $(CH_3)_2(C_6H_5)PH^+$, or $(C_2H_5)_2(C_6H_5)_2P^+$.

In this embodiment, there is given a coordination complex compound formed by arbitrarily combining the metal cation and an anion.

Among the compounds of the general formulae (V) and (VI), specifically, the following compounds may be particularly preferably used.

Examples of the compound of the general formula (V) include triethylammonium tetraphenylborate, tri(n-butyl) ammonium tetraphenylborate, trimethylammonium tetraphenylborate, triethylammonium tetrakis(pentafluorophenyl)borate, tri(n-butyl)ammonium tetrakis (pentafluorophenyl)borate, triethylammonium hexafluoroarsenate, pyridinium tetrakis(pentafluorophenyl) borate, pyrrolinium tetrakis(pentafluorophenyl)borate, N,N-dimethylanilinium tetrakis(pentafluorophenyl)borate, and methyldiphenylammonium tetrakis(pentafluorophenyl)borate.

Meanwhile, examples of the compound of the general formula (VI) include ferrocenium tetraphenylborate, dimethylferrocenium tetrakis(pentafluorophenyl)borate, ferrocenium tetrakis(pentafluorophenyl)borate, decamethylferrocenium tetrakis(pentafluorophenyl)borate, acetylferrocenium tetrakis(pentafluorophenyl)borate, formylferrocenium tetrakis(pentafluorophenyl)borate, cyanoferrocenium tetrakis(pentafluorophenyl)borate, silver tetraphenylborate, silver tetrakis(pentafluorophenyl)borate, trityl tetraphenylborate, trityl tetrakis(pentafluorophenyl)borate, and silver tetrafluoroborate.

A preferred coordination complex compound is one formed of a non-coordinating anion and a substituted triarylcarbenium. As the non-coordinating anion, for example, there may be given a compound represented by the general formula (VII):

$$(BZ^1Z^2Z^3Z^4)^- \qquad (VII)$$

wherein $Z^1$ to $Z^4$ each represent a hydrogen atom, a dialkylamino group, an alkoxy group, an aryloxy group, an alkyl group having 1 to 20 carbon atoms, an aryl group (including a halogen-substituted aryl group) having 6 to 20 carbon atoms, an alkylaryl group, an arylalkyl group, a substituted alkyl group, an organometalloid group, or a halogen atom.

Meanwhile, as the substituted triarylcarbenium, for example, there may be given a compound represented by the general formula (VIII).

$$[CR^{26}R^{27}R^{28}]^+ \qquad (VIII)$$

$R^{26}$, $R^{27}$, and $R^{28}$ in the general formula (VIII) each represent an aryl group, such as a phenyl group, a substituted phenyl group, a naphthyl group, or an anthracenyl group, and may be identical to or different from each other, provided that at least one thereof represents a substituted phenyl group, a naphthyl group, or an anthracenyl group.

The substituted phenyl group may be represented by, for example, the general formula (IX).

$$C_6H_{5-k}R^{29}{}_k \qquad (IX)$$

$R^{29}$ in the general formula (IX) represents a hydrocarbyl group having 1 to 10 carbon atoms, an alkoxy group, an aryloxy group, a thioalkoxy group, a thioaryloxy group, an amino group, an amide group, a carboxyl group, or a halogen atom, and "k" represents an integer of from 1 to 5.

When the "k" represents 2 or more, a plurality of $R^{29}$'s may be identical to or different from each other.

Specific examples of the non-coordinating anion represented by the general formula (VII) may include tetra (fluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(trifluoromethylphenyl)borate, tetra(toluyl)borate, tetra(xylyl)borate, (triphenyl, pentafluorophenyl)borate, [tris(pentafluorophenyl), phenyl]borate, and tridecahydride-7,8-dicarbaundecaborate.

In addition, specific examples of the substituted triarylcarbenium represented by the general formula (VIII) include tri(toluyl)carbenium, tri(methoxyphenyl)carbenium, tri (chlorophenyl)carbenium, tri(fluorophenyl)carbenium, tri (xylyl)carbenium, [di(toluyl), phenyl]carbenium, [di(methoxyphenyl), phenyl]carbenium, [di(chlorophenyl), phenyl]carbenium, [toluyl, di(phenyl)]carbenium, [methoxyphenyl, di(phenyl)]carbenium, and [chlorophenyl, di(phenyl)]carbenium.

The usage ratio (molar ratio) of the component (A) to the component (B) is preferably from 1/100 to 1/1, more preferably from 1/10 to 1/1.

A production method for the polymerization catalyst is not particularly limited, and a conventionally known method may be utilized. For example, the component (A) and the component (B) may be simultaneously added and mixed into a polymerization solvent, or after the addition of the component (A) to the polymerization solvent, the component (B) may be added and mixed into the mixture. In addition, the polymerization catalyst may be prepared in a polymerization reaction vessel by loading the respective components into the polymerization reaction vessel, or the following may be performed: the respective components are mixed in another vessel in advance to prepare a catalyst solution, and the resultant catalyst solution is loaded into the polymerization reaction vessel to perform a polymerization reaction.

There is no particular limitation on the polymerization solvent. Examples thereof include: aromatic hydrocarbons, such as benzene, toluene, xylene, and ethyl benzene; alicyclic hydrocarbons, such as cyclopentane, cyclohexane, methylcyclohexane, decalin, and tetralin; aliphatic hydrocarbons, such as pentane, hexane, heptane, and octane; and halogenated hydrocarbons, such as chloroform and dichloromethane. Among them, toluene, xylene, and decalin are preferred.

Those solvents may be used alone or in combination thereof. In addition, a monomer, such as an α-olefin, to be used for polymerization may be used as the solvent.

The olefin to be used in the present invention is not particularly limited, but is preferably an α-olefin having 2 to 20 carbon atoms. Examples of the α-olefin include: α-olefins, such as ethylene, propylene, 1-butene, 1-pentene, 1-hexene, 1-heptene, 1-octene, 1-nonene, 1-decene, 4-phenyl-1-butene, 6-phenyl-1-hexene, 3-methyl-1-butene, 4-methyl-1-butene, 3-methyl-1-pentene, 4-methyl-1-hexene, 5-methyl-1-hexene, 3,3-dimethyl-1-pentene, 3,4-dimethyl-1-pentene, 4,4-dimethyl-1-pentene, and vinylcyclohexane; dienes, such as 1,3-butadiene, 1,4-pentadiene, and 1,5-hexadiene; halogen-substituted α-olefins, such as hexafluoropropene, tetrafluoroethylene, 2-fluoropropene, fluoroethylene, 1,1-difluoroethylene, 3-fluoropropene, trifluoroethylene, and 3,4-dichloro-1-butene; cyclic olefins, such as cyclopentene, cyclohexene, norbornene, 5-methylnorbornene, 5-ethylnorbornene, 5-propylnorbornene, 5,6-dimethylnorbornene, and 5-benzylnorbornene; and styrene-based compounds, e.g., styrene, alkylstyrenes, such as p-methylstyrene, p-ethylstyrene, p-propylstyrene, p-isopropylstyrene, p-butylstyrene, p-tert-butylstyrene, p-phenylstyrene, o-methylstyrene, o-ethylstyrene, o-propylstyrene, o-isopropylstyrene, m-methylstyrene, m-ethylstyrene, m-isopropylstyrene, m-butylstyrene, mesitylstyrene, 2,4-dimethylstyrene, 2,5-dimethylstyrene, and 3,5-dimethylstyrene, alkoxystyrenes, such as p-methoxystyrene, o-methoxystyrene, and m-methoxystyrene, halogenated styrenes, such as p-chlorostyrene, m-chlorostyrene, o-chlorostyrene, p-bromostyrene, m-bromostyrene, o-bromostyrene, p-fluorostyrene, m-fluorostyrene, o-fluorostyrene, and o-methyl-p-fluorostyrene, and further, trimethylsilylstyrene, a vinylbenzoic acid ester, and divinylbenzene. Among them, propylene is preferably used.

In addition, the above-mentioned other olefin only needs to be appropriately selected from the olefins.

In the present invention, the olefins may be used alone or in combination thereof. When two or more kinds of olefins are copolymerized, the olefins may be arbitrarily combined.

In addition, in the present invention, the above-mentioned olefin and another monomer may be copolymerized. Examples of the other monomer to be used in this case may include: chain diolefins, such as butadiene, isoprene, 1,4-pentadiene, and 1,5-hexadiene; polycyclic olefins, such as norbornene, 1,4,5,8-dimethano-1,2,3,4,4a,5,8,8a-octahydronaphthalene, and 2-norbornene; cyclic diolefins, such as norbornadiene, 5-ethylidene norbornene, 5-vinylnorbornene, and dicyclopentadiene; and unsaturated esters, such as ethyl acrylate and methyl methacrylate.

A method of polymerizing the olefin is not particularly limited, and an arbitrary polymerization method, such as a slurry polymerization method, a solution polymerization method, a vapor phase polymerization method, a bulk polymerization method, or a suspension polymerization method, may be adopted.

A polymerization temperature is generally from −100° C. to 250° C., preferably from −50° C. to 200° C., more preferably from 0° C. to 130° C.

A polymerization pressure is preferably from normal pressure to 20 MPa (gauge), more preferably from normal pressure to 10 MPa (gauge).

A polymerization time is preferably from 5 minutes to 15 hours.

Further, as a method of controlling the molecular weight of the olefin-based polymer, for example, there are given: selection of the kind and usage amount of each component, and the polymerization temperature; and polymerization in the presence of hydrogen.

In the production method for an olefin-based polymer of this embodiment, the concentration of the component (A) is preferably from 0.001 µmol/L to 500 µmol/L. When the concentration falls within this range, satisfactory activity is obtained. From such viewpoint, the concentration of the component (A) is more preferably from 0.005 µmol/L to 250 µmol/L, still more preferably from 0.01 µmol/L to 100 µmol/L. The concentration of the component (A) herein refers to the concentration of the component (A) in a polymerization liquid. Therefore, the concentration of the component (A) refers to the following amount: in the case of a reaction system using a solvent and a liquid monomer, the amount of the component (A) with respect to the total amount of the solvent and the liquid monomer; when a liquid monomer is subjected to a reaction without the use of a solvent, the amount of the component (A) with respect to the liquid monomer; or when a gaseous monomer is subjected to a reaction using a solvent, the amount of the component (A) with respect to the solvent.

Further, in the production method for an olefin-based polymer of this embodiment, it is preferred that preliminary polymerization using the polymerization catalyst or preliminary polymerization during the course of the preparation of the catalyst be performed. The preliminary polymerization may be performed by bringing the catalyst or the catalyst during its preparation into contact with a small amount of an olefin, and a reaction temperature in this case is preferably from −20° C. to 100° C. more preferably from −10° C. to 70° C. still more preferably from 0° C. to 50° C. In addition, as a solvent to be used in the preliminary polymerization, a solvent selected from the above-mentioned polymerization solvents is preferably used, and an aliphatic hydrocarbon or an aromatic hydrocarbon is more preferred. The preliminary polymerization may be performed without any solvent. The amount of a preliminary polymerization product per 1 mmol of a transition metal component in the catalyst is preferably from 1 g to 10,000 g, and it is more preferred that conditions are adjusted so that the amount may be from 10 g to 1,000 g.

According to the production method for an olefin-based polymer of this embodiment, the meso pentad fraction [mmmm] of the olefin-based polymer to be obtained can be set to preferably 40% or more, more preferably 46% or more, still more preferably 48% or more, and can be set to preferably 70% or less, more preferably 65% or less, still more preferably 62% or less.

Accordingly, the solidification rate of the polymer can be increased, and hence the polymer may be suitably used in, for example, a hot-melt adhesive.

In addition, the limiting viscosity $[\eta]$ of the olefin-based polymer to be obtained measured in decalin at 135° C. is preferably from 0.08 dL/g to 1.5 dL/g, more preferably from 0.1 dL/g to 1.2 dL/g, still more preferably from 0.2 dL/g to 1.0 dL/g.

The meso pentad fraction [mmmm] and the limiting viscosity $[\eta]$ may be measured by methods described in Examples.

EXAMPLES

Next, the present invention is specifically described by way of Examples, but the present invention is not limited thereto.

[Measurement Methods]

Measurement values in the following Examples and Comparative Examples were measured using the methods described below. The results are shown in Table 1.

[Limiting Viscosity $[\eta]$]

Measurement was performed with an automatic viscometer VMR-053 manufactured by Rigo Co., Ltd. in a decalin solvent at 135° C.

[NMR Measurement]

A $^{13}$C-NMR spectrum was measured with the following device under the following conditions. The assignment of a peak was performed in accordance with the method proposed in "Macromolecules, 8, 687 (1975)" by A. Zambelli et al.

Device: "$^{13}$C-NMR spectrometer, JNM-EX400 series" manufactured by JEOL Ltd.

Method: proton complete decoupling method
Concentration: 220 mg/mL
Solvent: a mixed solvent of 1,2,4-trichlorobenzene and deuterated benzene at 90:10 (volume ratio)
Temperature: 130° C.
Pulse width: 45°
Pulse repetition time: 4 seconds
Accumulation: 10,000 times $M = m/S \times 100$ $R = \gamma/S \times 100$ $S = P\beta\beta + P\alpha\beta + P\alpha\gamma$      <Calculation Formulae>

S: signal intensity of carbon atoms of side-chain methyl in all propylene units
Pββ: 19.8 ppm to 22.5 ppm
Pαβ: 18.0 ppm to 17.5 ppm
Pαγ: 17.5 ppm to 17.1 ppm
γ: racemic pentad chain: 20.7 ppm to 20.3 ppm
m: meso pentad chain: 21.7 ppm to 22.5 ppm The meso pentad fraction [mmmm] is determined in accordance with the method proposed in "Macromolecules, 6, 925 (1973)" by A. Zambelli et al., and is a meso fraction in a pentad unit in a polypropylene molecular chain measured with the signal of a methyl group in the $^{13}$C-NMR spectrum. As the meso pentad fraction [mmmm] becomes larger, the stereoregularity of a polymer to be obtained becomes higher.

Further, a 2,1-bond fraction and a 3,1-bond fraction were calculated from the measurement results of the $^{13}$C-NMR spectrum by using the following formulae.

<Propylene-Based Polymer>

2,1-Bond fraction=$[(A+B)/2]/(A+B+C+D) \times 100$ (mol %)

3,1-Bond fraction=$(D/2)/(A+B+C+D) \times 100$ (mol %)

A: integral value in the range of from 15 ppm to 15.5 ppm
B: integral value in the range of from 17 ppm to 18 ppm
C: integral value in the range of from 19.5 ppm to 22.5 ppm
D: integral value in the range of from 27.6 ppm to 27.8 ppm

Example 1

Synthesis of (1,2'-Dimethylsilylene)(2,1'-dimethylsilylene)bis(3-cyclohexylmethylindenyl)zirconium Dichloride [Transition Metal Compound a1]

(1,2'-Dimethylsilylene)(2,1'-dimethylsilylene)bis(3-cyclohexylmethylindenyl)zirconium dichloride was synthesized in the same manner as in Example 9 of JP 2000-256411 A except that bromomethylcyclohexane was added instead of iodomethyltrimethylsilane.

Example 2

Synthesis of (1,2'-Dimethylsilylene)(2,1'-dimethylsilylene)bis(3-cyclopropylmethylindenyl)zirconium Dichloride [Transition Metal Compound a2]

(1,2'-Dimethylsilylene)(2,1'-dimethylsilylene)bis(3-cyclopropylmethylindenyl)zirconium dichloride was synthesized in the same manner as in Example 9 of JP 2000-256411 A except that bromomethylcyclopropane was added instead of iodomethyltrimethylsilane.

Example 3

Synthesis of (1,2'-Dimethylsilylene)(2,1'-dimethylsilylene)bis(3-cyclopropylindenyl)zirconium Dichloride [Transition Metal Compound a3]

(3-1) Synthesis of 1-Cyclopropylindene

A diethyl ether solution of cyclopropylmagnesium bromide, which had been prepared from 163.3 g (1,350 mmol) of cyclopropyl bromide and 65.6 g (2,700 mmol) of magnesium, was dropped in a diethyl ether solution of 118 g (900 mmol) of 1-indanone, and then the mixture was stirred at room temperature (25° C.) for 10 hours. After that, a 20% aqueous solution of sulfuric acid (50 mL) was added to the mixture, and the whole was stirred under heating at 40° C. for 3 hours. After that, 300 mL of water was added to the resultant, and the mixture was extracted with 400 mL of diethyl ether. The extract was washed with a saturated sodium hydrogen carbonate solution, water, and brine, and was then dried with anhydrous magnesium sulfate. Further, the solvent was evaporated off, and then the resultant solid was purified with a silica gel column (developing solvent: hexane) to provide 38.0 g of 1-cyclopropylindene as a pale yellow oily product.

(3-2) Synthesis of 1-Cyclopropyl-2-bromoindene 200 mL of dimethyl sulfoxide (DMSO) and 13 mL of water were added to 38.0 g (243 mmol) of 1-cyclopropylindene, and 43.3 g of N-bromosuccinimide was slowly added to the mixture. Next, the mixture was stirred at room temperature (25° C.) for 10 hours, and then 200 mL of water was added thereto at 0° C., followed by the extraction of the reaction mixture with 400 mL of diethyl ether. The extract was dried, and then the solvent was evaporated off. Thus, a brown solid was obtained. The brown solid was loaded into a 1-liter three-necked flask having incorporated thereinto a Dean-Stark apparatus together with 200 mL of toluene and 1.3 g of p-toluenesulfonic acid, and the mixture was heated to reflux for 3 hours. After the reaction mixture had been left standing to cool, the reaction mixture was washed with water and brine, and the solvent was evaporated off under reduced pressure. Thus, a blackish brown oily product was obtained. The oily product was purified with a silica column (developing solvent: hexane) to provide 16.6 g (70.6 mmol, yield: 29%) of 1-cyclopropyl-2-bromoindene as a white solid.

(3-3) Synthesis of (1,2'-Dimethylsilylene)(2,1'-dimethylsilylene)bis(3-cyclopropylindene)

3.4 g of a magnesium piece suspended in 100 mL of tetrahydrofuran (THF) was activated with 0.2 mL of 1,2-dibromoethane. A solution of 16.6 g (70.6 mmol) of 1-cyclopropyl-2-bromoindene in 100 mL of THF was slowly added to the resultant, and the mixture was stirred at room temperature (25° C.) for 2 hours. After that, 4.3 mL (35.3 mmol) of dichlorodimethylsilane was added to the mixture at 0° C. Further, the mixture was stirred at room temperature (25° C.) for 4 hours, and then THF was evaporated off under reduced pressure. Next, the reaction mixture was extracted with 150 mL of hexane twice, and the solvent was evaporated off. Thus, dimethylbis(3-cyclopropylinden-2-yl)silane was obtained as a white solid.

120 mL of diethyl ether was added to 12.5 g (34.0 mmol) of dimethylbis(3-cyclopropylinden-2-yl)silane thus obtained, and 26.8 mL of a hexane solution of n-butyllithium (2.66 M) was dropped in the mixture at −20° C. Next, the mixture was stirred at room temperature (25° C.) for 2 hours, and was then left at rest. The supernatant was separated by filtration, and the precipitate portion was dried under reduced pressure. The addition of 150 mL of THF to the dried product provided a yellowish brown uniform solution. 4.1 mL (34.0 mmol) of dichlorodimethylsilane was added to the solution at 0° C., and the mixture was stirred under heating at 55° C. for 6 hours. The produced white precipitate was separated by filtration, and was dried under reduced pressure. Thus, 10.2 g of (1,2'-dimethylsilylene)(2,1'-dimethylsilylene)bis(3-cyclopropylindene) was obtained (yield: 71%).

(3-4) Synthesis of (1,2'-Dimethylsilylene)(2,1'-dimethylsilylene)bis(3-cyclopropylindenyl)zirconium Dichloride 10.2 g (24.0 mmol) of (1,2'-dimethylsilylene)(2,1'-dimethylsilylene)bis(3-cyclopropylindene) was suspended in 80 mL of diethyl ether. Next, n-butyllithium (2.66 M, 18.9 mL, 50.3 mmol) was dropped in the suspension at −20° C., and the mixture was stirred at room temperature (25° C.) for 3 hours. The produced white precipitate was separated by filtration, and was then dried under reduced pressure. Next, 30 mL of toluene was added to the dried product, and 5.6 g (24.0 mmol) of zirconium tetrachloride suspended in 20 mL of toluene was added to the mixture at 0° C., followed by stirring at room temperature (25° C.) for 4 hours. The resultant yellow precipitate was separated by filtration, and was recrystallized from dichloromethane to provide 4.2 g of (1,2'-dimethylsilylene)(2,1'-dimethylsilylene)bis(3-cyclopropylindenyl)zirconium dichloride as a yellow solid (yield: 30%).

Example 4

Synthesis of (1,2'-Dimethylsilylene)(2,1'-dimethylsilylene)bis(3-cyclobutylmethylindenyl)zirconium Dichloride [Transition Metal Compound a4]

(1,2'-Dimethylsilylene)(2,1'-dimethylsilylene)bis(3-cyclobutylmethylindenyl)zirconium dichloride was synthesized in the same manner as in Example 9 of JP 2000-256411 A except that bromomethylcyclobutane was added instead of iodomethyltrimethylsilane.

Comparative Example 1

Synthesis of (1,2'-Dimethylsilylene)(2,1'-dimethylsilylene)bis(3-trimethylsilylmethylindenyl)zirconium Dichloride [Transition Metal Compound b1]

(1,2'-Dimethylsilylene)(2,1'-dimethylsilylene)bis(3-trimethylsilylmethylindenyl)zirconium dichloride was synthesized by the method described in Example 9 of JP 2000-256411 A.

Example 5

400 mL of dry heptane was loaded into a 1-liter autoclave, which had been dried under heating, under a nitrogen atmosphere at room temperature (25° C.). Next, triisobutylaluminum (2 M, 0.2 mL, 0.4 mmol) was loaded into the autoclave, and the mixture was stirred. Further, a heptane slurry (10 μmol/mL, 0.02 mL, 0.2 μmol) of (1,2'-dimethylsilylene)(2,1'-dimethylsilylene)bis(3-cyclohexylmethylindenyl)zirconium dichloride [transition metal compound a1] obtained in Example 1 and a heptane slurry (10 μmol/mL, 0.08 mL, 0.8 μmol) of N,N-dimethylanilinium tetrakis(pentafluorophenyl)borate were loaded into the autoclave. Further, hydrogen (0.05 MPa) was loaded into the autoclave, and then the temperature in the autoclave was increased while a propylene pressure was gradually increased. Polymerization was performed for 60 minutes while the total pressure and the temperature were kept constant at 0.8 MPa and 60° C., respectively. After the completion of the polymerization reaction, the polymerization was stopped with 5 mL of ethanol, and the resultant polymerization solution was dried in a stream of heated nitrogen to provide 177.3 g of a polypropylene. The meso pentad fraction [mmmm] of the resultant polymer was 51.4%, the limiting viscosity [η] thereof measured in decalin at 135° C. was 0.94 dL/g, and the polymerization activity thereof was 9,715 kgPP/gZr.

Examples 6 to 12, and Comparative Examples 2 and 3

Polypropylenes of Examples 6 to 12, and Comparative Examples 2 and 3 were each obtained in the same manner as in Example 5 except that the transition metal compound, the polymerization temperature, and the polymerization time were changed as shown in Table 1.

| | Transition metal compound | | Polymerization temperature [° C.] | Polymerization time [min.] | 2,1-Bond fraction [mol %] | 3,1-Bond fraction [mol %] | Yield (g) | [mmmm] (%) | [η] dL/g | Catalytic activity*2 [kgPP/gZr] |
|---|---|---|---|---|---|---|---|---|---|---|
| | Kind | Usage amount*1 [μmol-Zr] | | | | | | | | |
| Example 5 | a1 | 0.2 | 60 | 60 | 0 | 0 | 177.3 | 51.4 | 0.94 | 9,715 |
| Example 6 | a1 | 0.2 | 70 | 60 | 0 | 0 | 171.4 | 48.7 | 0.61 | 9,397 |
| Example 7 | a2 | 0.2 | 60 | 30 | 0 | 0 | 96.5 | 62.1 | 0.94 | 5,287 |
| Example 8 | a2 | 0.2 | 70 | 30 | 0 | 0 | 97.2 | 60.1 | 0.56 | 5,325 |
| Example 9 | a3 | 0.2 | 60 | 30 | 0 | 0.2> | 37.0 | 60.0 | 0.75 | 2,028 |
| Example 10 | a3 | 0.2 | 70 | 30 | 0 | 0 | 25.0 | 54.6 | 0.44 | 1,369 |
| Example 11 | a4 | 0.2 | 60 | 30 | 0 | 0 | 126.1 | 52.2 | 0.94 | 6,912 |
| Example 12 | a4 | 0.2 | 70 | 30 | 0 | 0 | 134.7 | 51.1 | 0.58 | 7,383 |
| Comparative Example 2 | b1 | 0.2 | 60 | 60 | 0 | 0 | 232.8 | 47.2 | 1.04 | 12,760 |
| Comparative Example 3 | b1 | 0.2 | 70 | 60 | 0 | 0 | 242.2 | 47.0 | 0.66 | 13,275 |

*1 A molar quantity in terms of zirconium (Zr)
*2 The amount of a polypropylene obtained per 1 g of Zr in a transition metal compound

INDUSTRIAL APPLICABILITY

The use of the production method for an olefin-based polymer, and the transition metal compound having a specific structure, of the present invention can provide an olefin-based polymer having high stereoregularity.

The invention claimed is:

1. A transition metal compound represented by formula (I):

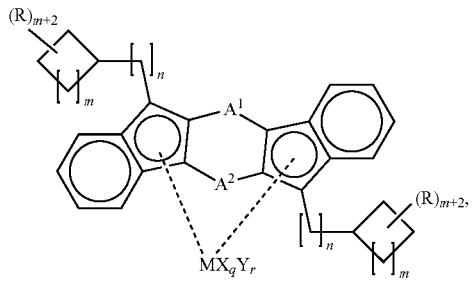

(I)

wherein

M represents a transition metal selected from Groups 3 to 10 of the periodic table, or a lanthanoid series thereof;

$A^1$ and $A^2$ are identical to or different from each other, and represent a crosslinking group represented by formula (II):

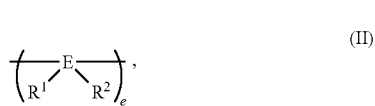

(II)

E represents C, Si, Ge, or Sn, $R^1$ and $R^2$ each independently represent a hydrogen atom, a halogen atom, a hydrocarbon group having 1 to 20 carbon atoms, or a halogenated hydrocarbon group having 1 to 20 carbon atoms, and may be identical to or different from each other, or may be bonded to each other to form a ring, and "e" represents an integer of from 1 to 4;

X represents a σ-bonding or π-bonding ligand, and when a plurality of X's are present, the plurality of X's are identical to or different from each other;

Y represents a Lewis base, and when a plurality of Y's are present the plurality of Y's are identical to or different from each other, and Y is optionally crosslinked with another Y or X;

q represents an integer of from 1 to 5, and q=[(valence of M)−2];

r represents an integer of from 0 to 3;

n represents an integer of from 0 to 4;

m represents an integer of from 0 to 4; and

R represents a substituent of a cycloalkyl group, and a plurality of R's are identical to or different from each other.

2. The compound of claim 1, wherein n represents 0 or 1.

3. The compound of claim 1, wherein when n represents 2, the transition metal compound represented by the general formula (I) is a transition metal compound represented by formula (III), and when the n represents 3, the transition metal compound represented by formula (I) is a transition metal compound represented by formula (IV):

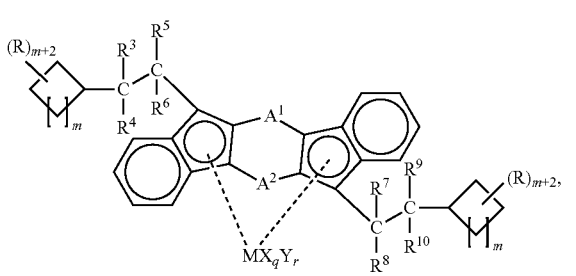

(III)

wherein $A^1$, $A^2$, X, Y, M, R, q, r and m are as described above, and $R^3$ to $R^{10}$ each independently represent a hydrogen atom or an alkyl group;

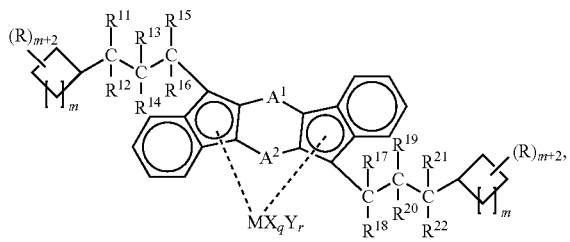

(IV)

wherein $A^1$, $A^2$, X, Y, M, R, q, r and m are as described above, and $R^{11}$ to $R^{22}$ each independently represent a hydrogen atom or an alkyl group.

4. The compound of claim 1, wherein the m represents 0 or 1.

5. The compound of claim 1, wherein E represents Si or Ge.

6. The compound of claim 1, wherein M represents a metal element belonging to Group 4 of the periodic table.

7. The compound of claim 1, wherein each R independently represents a hydrogen atom, an alkyl group, an aryl group, a halogen atom, an amino group, or a sulfur-containing group, and when the R's each represent an alkyl group, two adjacent alkyl groups may form a ring.

8. A production method for an olefin-based polymer, comprising polymerizing an olefin in the presence of a polymerization catalyst containing the transition metal compound of claim 1.

9. The method of claim 8, wherein the polymerization catalyst further contains a boron compound capable of reacting with the transition metal compound to form an ionic complex.

* * * * *